US010728758B2

(12) United States Patent
Agiwal et al.

(10) Patent No.: US 10,728,758 B2
(45) Date of Patent: Jul. 28, 2020

(54) METHOD OF SECURED TRANSMISSION AND RECEPTION OF DISCOVERY MESSAGE IN A D2D COMMUNICATION SYSTEM

(71) Applicant: Samsung Electronics Co., Ltd., Suwon-si, Gyeonggi-do (KR)

(72) Inventors: Anil Agiwal, Bangalore (IN); Rajavelsamy Rajadurai, Bangalore (IN); Youngbin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 160 days.

(21) Appl. No.: 15/540,714

(22) PCT Filed: Jan. 18, 2016

(86) PCT No.: PCT/KR2016/000511
§ 371 (c)(1),
(2) Date: Jun. 29, 2017

(87) PCT Pub. No.: WO2016/114640
PCT Pub. Date: Jul. 21, 2016

(65) Prior Publication Data
US 2017/0374549 A1    Dec. 28, 2017

(30) Foreign Application Priority Data

Jan. 16, 2015 (IN) .............................. 263/CHE/2015
Jan. 14, 2016 (IN) .............................. 263/CHE/2015

(51) Int. Cl.
*H04L 29/06* (2006.01)
*H04W 12/06* (2009.01)
(Continued)

(52) U.S. Cl.
CPC ........... *H04W 12/06* (2013.01); *H04L 63/061* (2013.01); *H04L 63/0876* (2013.01);
(Continued)

(58) Field of Classification Search
CPC ..... H04W 12/06; H04W 76/14; H04W 76/10; H04W 4/023; H04W 8/00; H04W 8/186;
(Continued)

(56) References Cited

U.S. PATENT DOCUMENTS 9,549,313 B2 * 1/2017 Park ....................... H04W 8/205
9,706,396 B2 * 7/2017 Agiwal ............... H04L 63/0428
(Continued)

FOREIGN PATENT DOCUMENTS

KR  10-2014-0118496 A    10/2014
WO  2014/187527 A1       11/2014

OTHER PUBLICATIONS

3GPP; TSG SA; Proximity-based Services (ProSe); Security aspects (Release 12), 3GPP TS 33.303 V12.1.0, Sep. 24, 2014.
(Continued)

*Primary Examiner* — Sarah Su
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). The various embodiments of the present invention disclose a method of secured transmission and reception of discovery message in device to device (D2D) communication system. According to one embodiment, a transmitting user equipment (UE) receives a ProSe group key (PGK) from a Prose function to perform a D2D communication in a D2D public safety group. The transmitting UE then derives a ProSe traffic key (PTK) using the PGK for transmitting data
(Continued)

packets in the D2D communication. Using the PTK, the transmitting UE further derives a Prose integrity protection key (PIK) for securing a discovery message to discover one or more receiving UEs. The transmitting UE transmits the integrity protected discovery message using the derived PIK to the receiving UE. In turn, the receiving UE transmits a response message in a secure manner by deriving a PIK using PGK configured for the receiving UE. The various embodiments of the present invention disclose a method of a terminal. According to one embodiment, the method comprises of deriving a first traffic key and a second traffic key based on a group key, deriving a first security key for securing a discovery message based on the first traffic key and a second security key for securing data packets based on the second traffic key, and transmitting the discovery message generated based on the first security key.

20 Claims, 5 Drawing Sheets

(51) Int. Cl.
H04W 76/10 (2018.01)
H04W 12/04 (2009.01)
H04W 12/08 (2009.01)
H04W 12/10 (2009.01)
H04W 8/00 (2009.01)
H04W 76/14 (2018.01)
H04W 4/02 (2018.01)
H04W 8/18 (2009.01)

(52) U.S. Cl.
CPC ........... *H04L 63/123* (2013.01); *H04W 4/023* (2013.01); *H04W 8/00* (2013.01); *H04W 8/186* (2013.01); *H04W 12/04* (2013.01); *H04W 12/08* (2013.01); *H04W 12/10* (2013.01); *H04W 76/10* (2018.02); *H04W 76/14* (2018.02); *H04L 63/065* (2013.01); *H04L 2463/061* (2013.01)

(58) Field of Classification Search
CPC ..... H04W 12/04; H04W 12/08; H04W 12/10; H04L 63/061; H04L 63/0876; H04L 63/123; H04L 63/065; H04L 2463/061
See application file for complete search history.

(56) References Cited

U.S. PATENT DOCUMENTS

| | | | |
|---|---|---|---|
| 10,142,769 B2* | 11/2018 | Agiwal | H04W 12/04 |
| 10,187,531 B2* | 1/2019 | Rajadurai | H04M 15/61 |
| 10,212,597 B2* | 2/2019 | Zhang | H04W 12/0401 |
| 2013/0290696 A1* | 10/2013 | Broustis | H04L 9/0861 |
| | | | 713/150 |
| 2013/0315389 A1* | 11/2013 | Jung | H04L 63/065 |
| | | | 380/31 |
| 2014/0115325 A1* | 4/2014 | Detienne | H04L 63/0209 |
| | | | 713/160 |
| 2014/0119544 A1 | 5/2014 | Lee | |
| 2014/0295868 A1* | 10/2014 | Lee | H04W 76/27 |
| | | | 455/452.1 |
| 2015/0382189 A1* | 12/2015 | Zhang | H04L 63/061 |
| | | | 380/285 |
| 2016/0119963 A1 | 4/2016 | Casati | |
| 2016/0127309 A1* | 5/2016 | Yun | H04W 4/70 |
| | | | 709/245 |
| 2016/0127882 A1* | 5/2016 | Agiwal | H04L 9/0861 |
| | | | 713/150 |
| 2016/0157080 A1* | 6/2016 | Agiwal | H04W 4/70 |
| | | | 370/328 |
| 2016/0309401 A1 | 10/2016 | Baek et al. | |
| 2016/0330619 A1* | 11/2016 | Suh | H04L 63/0892 |
| 2016/0338092 A1* | 11/2016 | Agiwal | H04W 72/1289 |
| 2017/0374549 A1* | 12/2017 | Anil | H04W 76/14 |
| 2019/0297641 A1* | 9/2019 | Agiwal | H04W 72/1289 |
| 2019/0306706 A1* | 10/2019 | Zhang | H04W 12/04031 |

OTHER PUBLICATIONS

Qualcomm Incorporated, Using a single group key and bearer level security for ProSe one-to-many communication, S3-140136, 3GPP TSG SA WG3 (Security) Meeting #74, Jan. 13, 2014, Taipei, Taiwan.
Qualcomm Incorporated, Adding solution #3.6 to the ProSe TS, S3-140987, 3GPP TSG SA WG3 (Security) Meeting #75, May 19, 2014, Sapporo, Japan.
Chinese Office Action dated Mar. 19, 2020, issued in Chinese Application No. 201680005109.1.

* cited by examiner

[Fig. 1]
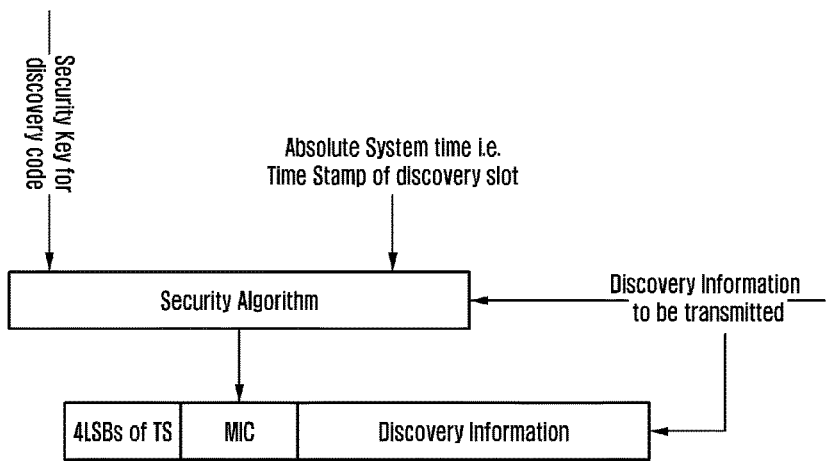
[Fig. 2a]
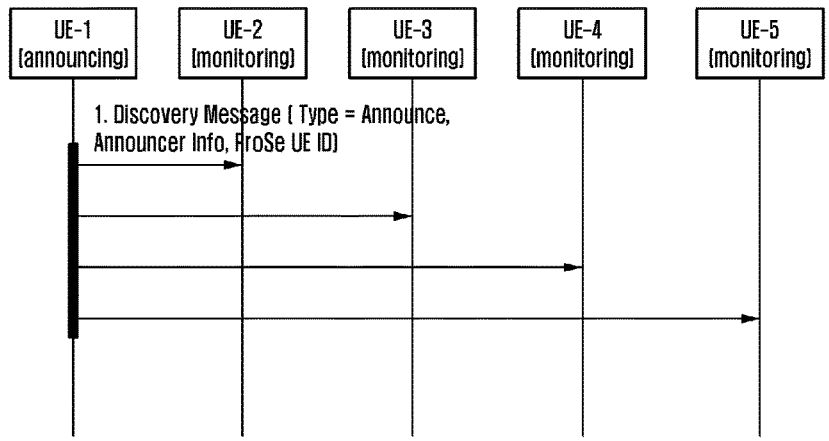
[Fig. 2b]
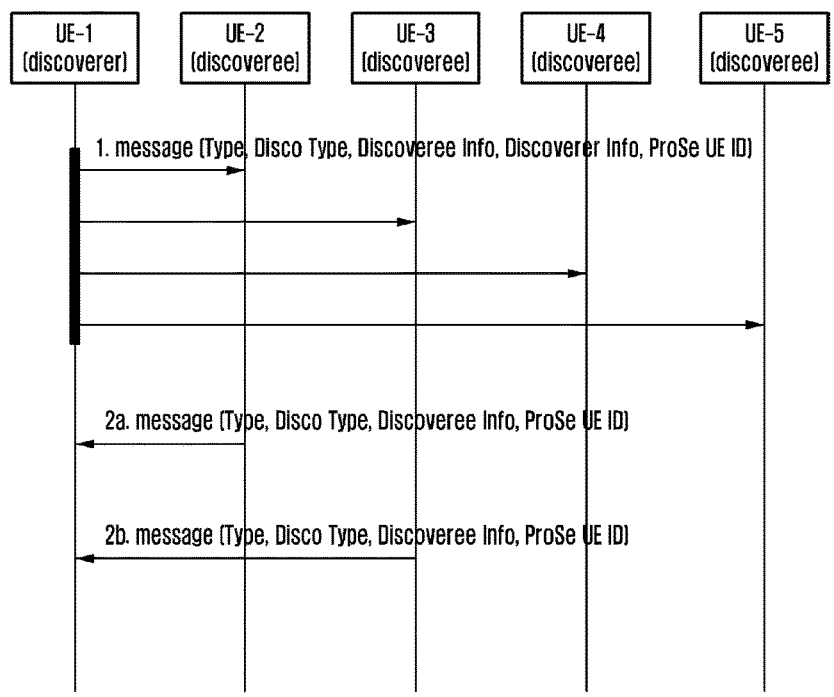

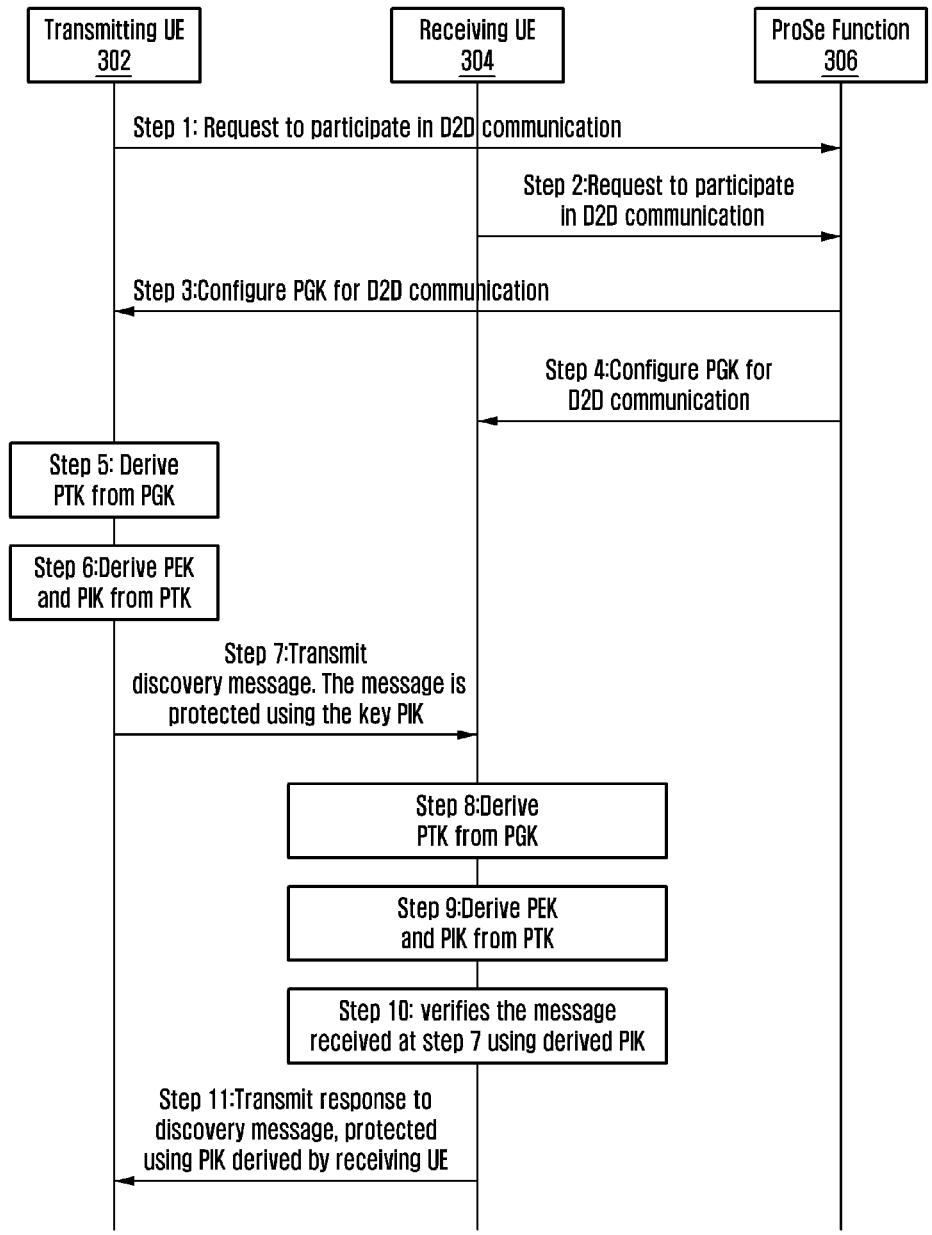

[Fig. 4]
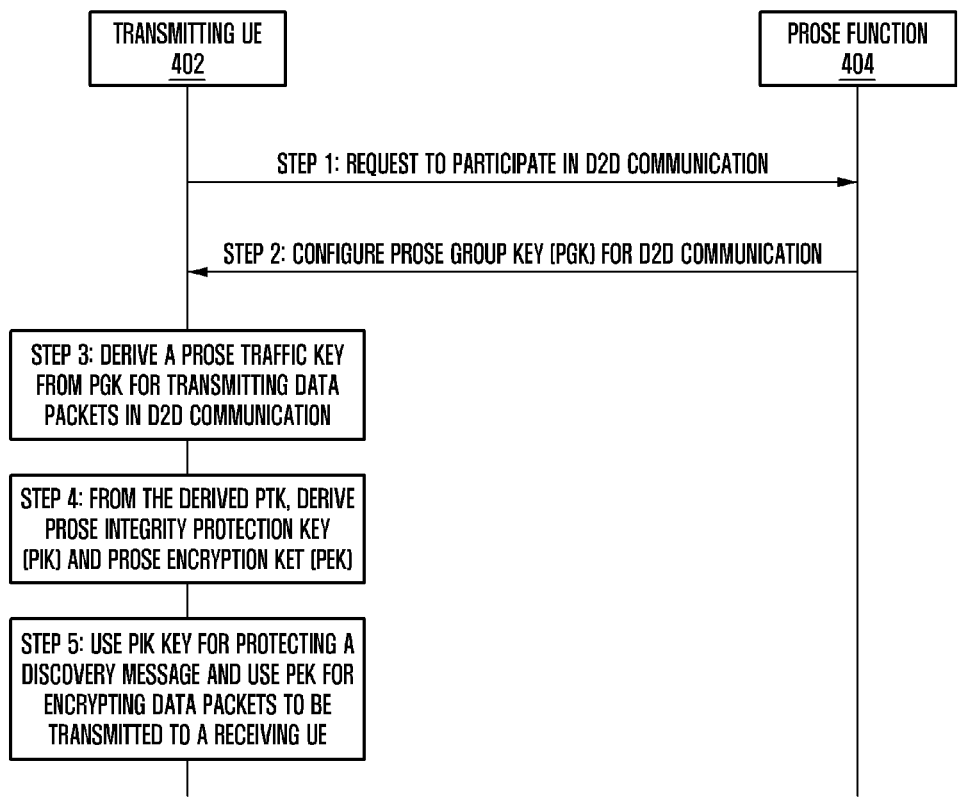
[Fig. 5]
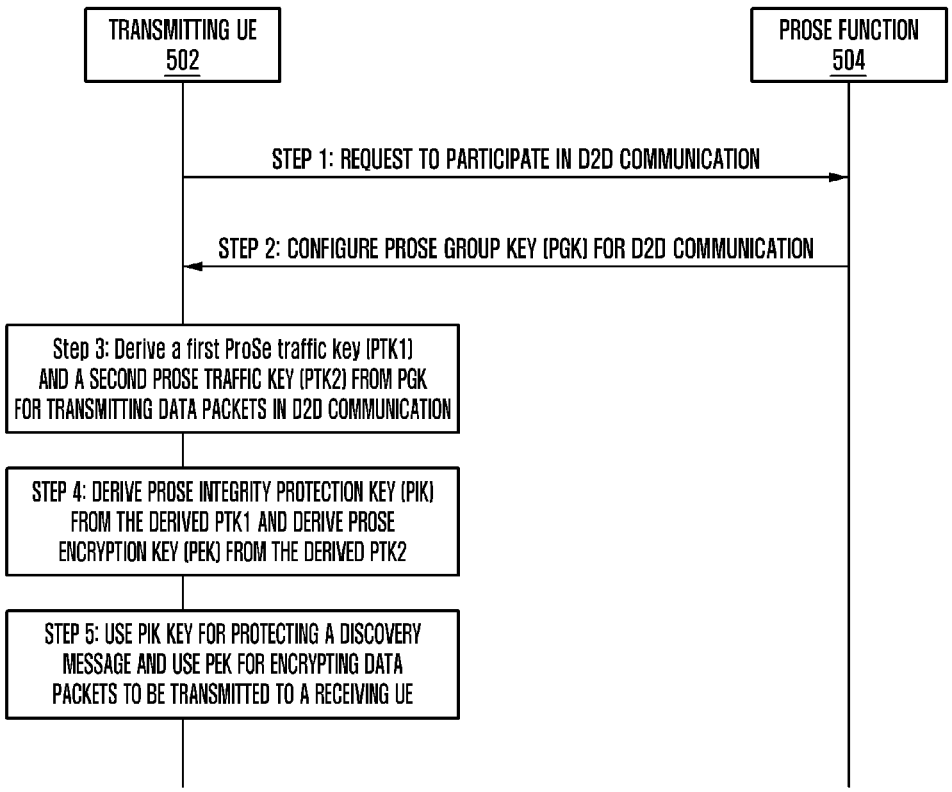

[Fig. 6]
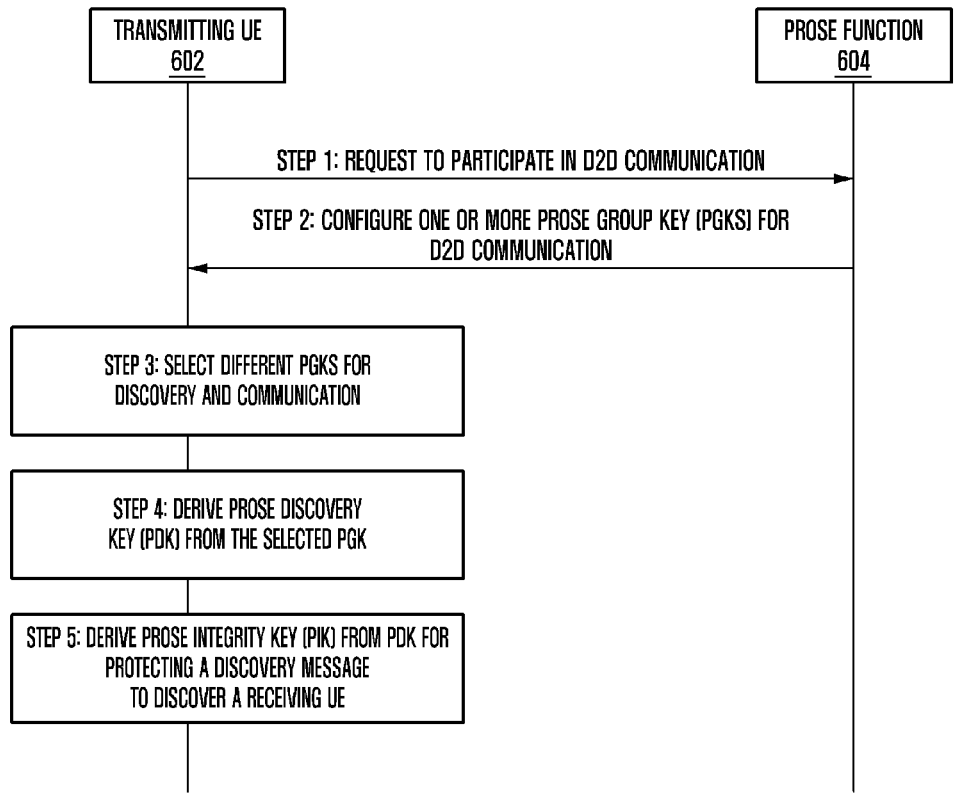
[Fig. 7]
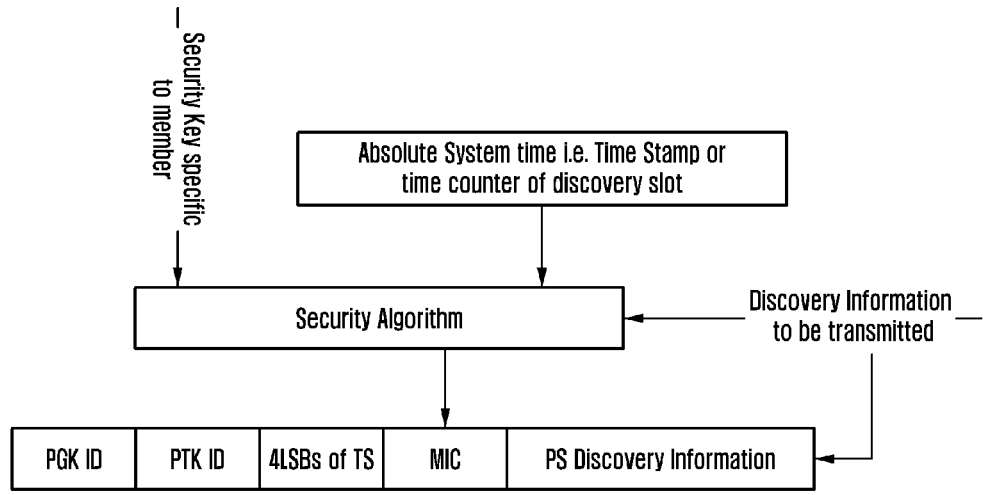

[Fig. 8]
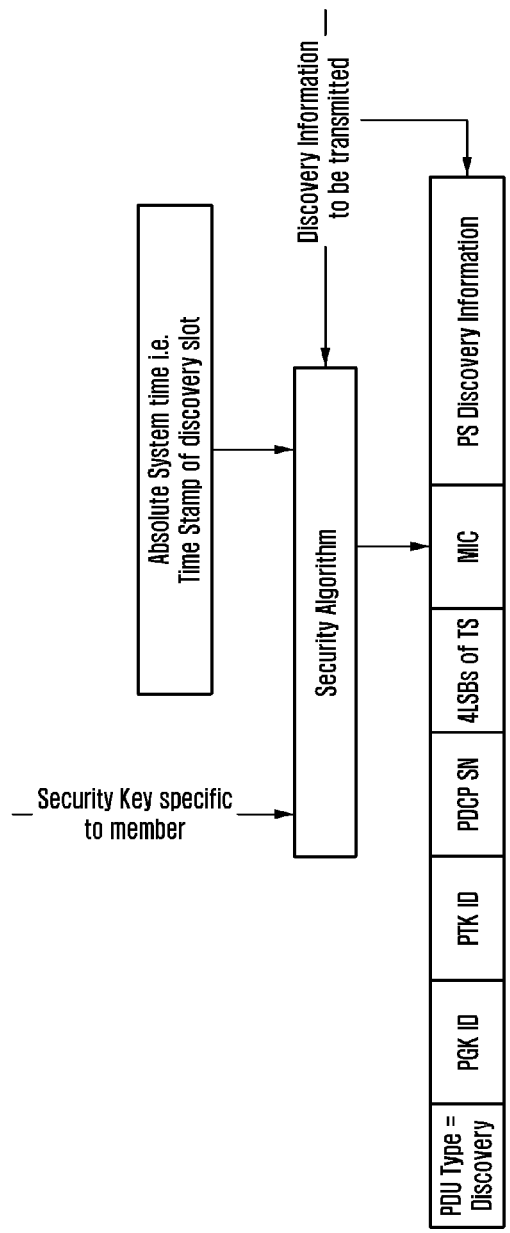

METHOD OF SECURED TRANSMISSION AND RECEPTION OF DISCOVERY MESSAGE IN A D2D COMMUNICATION SYSTEM

TECHNICAL FIELD

The present invention generally relates to device to device (D2D) communications, and more particularly relates to a method of secured transmission and reception of discovery message in a D2D communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Device to Device (D2D) communication is being studied in communication standard groups to enable discovery and data communication services between one or more devices. Discovery is a process which determines that a D2D-enabled User Equipment (UE) is in proximity of another D2D-enabled UE. A discovering D2D-enabled UE determines whether or not another D2D-enabled UE is of interest to the discovering D2D-enabled UE using D2D Discovery. The D2D-enabled UE is of interest to a discovering D2D-enabled UE if proximity of D2D-enabled UE needs to be known by one or more authorized applications on the discovering D2D-enabled UE. For e.g. a social networking application can be enabled to use D2D discovery feature. The D2D discovery enables the D2D-enabled UE of a given user of a social networking application to discover and be discoverable by the D2D-enabled UEs of his/her friends. In another example, the D2D discovery can enable the D2D-enabled UE of a given user of a search application to discover stores/restaurants etc. of its interest in its proximity. In another example, the D2D-enabled public safety UE would need to discover other D2D-enabled public safety UE, which belong to the same group, is in its proximity. Also, a D2D-enabled UE may need to discover whether any group members are in its proximity. Further, the D2D-enabled UE discovers other D2D-enabled UEs in its proximity by using direct UE-to-UE signaling.

According to the existing discovery mechanism, the discovery message transmitted for discovery comprises of discovery information (discovery code), Message Integrity Code (MIC) and 4 least significant bits (LSBs) of time counter. The discovery code is a pseudo ID assigned to each user of a discovery application in the UE. In order to protect the discovery information against replay and impersonation attack a security key is assigned to each discovery code by a ProSe Function and provided to the UE. The discovery message is protected as shown in FIG. 1. A transmitter of discovery message secures the discovery message using the security key corresponding to the discovery code in the discovery information being transmitted. The time stamp (or time counter) corresponding to the discovery slot in which the discovery information is transmitted is also used as an input to security algorithm. The receiver of discovery message sends the received discovery information together with MIC and time stamp (or time counter) corresponding to discovery slot in which discovery message is received to the ProSe function. The ProSe function validates the MIC using the security key corresponding to the discovery code.

Currently, it is being discussed to use the discovery mechanism for public safety communication to discover group members. Each public safety UE belongs to one or more groups. FIG. 2A illustrates an exemplary discovery mechanism used to discover a group member. As shown in FIG. 2A, a discoverable UE (also known as announcing UE) periodically announces a discovery message. A discovering UE which wants to discover another member of its group periodically monitor discovery channel for discovery message announced by the member being discovered.

FIG. 2B illustrates another exemplary discovery mechanism used to discover a group member. As shown in FIG. 2B, a discoverer UE which wants to discover another member of its group transmits a discovery message 1, indicating that it is searching for a specific member of its group. The discoverer UE monitors the discovery channel for a discovery message from discoveree UE after sending the discovery message 1. The discoveree UE (i.e. UE being discovered) monitors the discovery channel for discovery message 1 indicating that a discoverer UE is searching for it. If the discoveree UE receives a discovery message 1 searching for it from a discoverer UE then the discoveree UE announces a discovery message 2 with its information.

DISCLOSURE OF INVENTION

Technical Problem

The group member discovery should be possible irrespective of whether the discovering UE and/or UE being discovered is in coverage of network or out of coverage of network (e.g., for critical communication between the public safety agents). The current discovery mechanism operates only in the coverage of network and the security validation is performed by the ProSe Function in the network (e.g., commercial use cases).

Thus, there is a need for a novel method and system for securing discovery messages which works irrespective of whether the discovering UE and/or UE being discovered is in coverage of network or out of coverage of network.

Solution to Problem

Various embodiments of the present invention herein describe a method of secured transmission and reception of discovery message in device to device (D2D) communication system is disclosed. In one embodiment, the method comprises of receiving, by a transmitting user equipment (UE), at least one ProSe group key (PGK) to perform a secure D2D discovery in a D2D Public Safety (PS) group, deriving, by the transmitting UE, a ProSe traffic key (PTK) from the at least one PGK for transmitting data packets in the D2D PS group, deriving, by the transmitting UE, a Prose integrity protection key (PIK) from the derived PTK for securing a discovery message to discover one or more receiving UEs, integrity protecting, by the transmitting UE, the discovery message using the derived PIK, transmitting, by the transmitting UE, the integrity protected discovery message to the one or more receiving UEs, and receiving, by the transmitting UE, a response to the discovery message from the one or more receiving UEs, wherein the one or more receiving UEs derives a PIK using a PGK for allowing the receiving UE to securely transmit the response.

According to one embodiment, the integrity protected discovery message comprises at least one of a PGK ID, a PTK ID, a PIK ID, a message integrity code (MIC), and a discovery code.

According to one embodiment, the method further comprises of deriving, by the transmitting UE, a ProSe Encryption key (PEK) from the derived PTK for securely transmitting data packets to the one or more receiving UEs.

According to one embodiment, the method further comprises of verifying, by the receiving UE, the received discovery message using the derived PIK, and transmitting the response to the discovery message securely using the derived PIK According to one embodiment, the PGK is a group specific key used for ProSe PS discovery protection and identified using an 8 bit PGK ID. Also, every PGK has an expiry time.

According to one embodiment, the PTK is a group member specific traffic key for ProSe PS discovery protection and identified using a 16 bit PTK ID.

According to another embodiment, a method for secured transmission and reception of discovery message in device to device (D2D) communication system is disclosed. The method comprises of receiving, by a transmitting user equipment (UE), at least one ProSe group key (PGK) to perform a secure D2D discovery in a D2D public safety group, deriving, by the transmitting UE, a first Prose traffic key and a second Prose traffic key using the received at least one PGK for securely transmitting data packets and verifying data packets received in the D2D public safety group, deriving, by the transmitting UE, a ProSe integrity protection key (PIK) using the derived first ProSe traffic key for securing a discovery message to discover one or more receiving UEs, integrity protecting, by the transmitting UE, the discovery message using the derived PIK, transmitting, by the transmitting UE, the integrity protected discovery message to the one or more receiving UEs, and receiving, by the transmitting UE, a response to the discovery message from the one or more receiving UEs, wherein the receiving UE derives a PIK using a PGK for the receiving UE to securely transmit the response.

According to one embodiment, the method further comprises of deriving Prose encryption Key (PEK) from the second ProSe traffic key for securing data packets to be transmitted to one or more receiving UEs.

According to one embodiment, the method further comprises of verifying, by the receiving UE, the received discovery message using the derived PIK, and transmitting the response to the discovery message securely using the derived PIK.

According to yet another embodiment, a method for secured transmission and reception of discovery message in device to device (D2D) communication system is disclosed. The method comprises of receiving, by a transmitting user equipment (UE), a plurality of ProSe group keys (PGKs) for a group associated with the transmitting UE to perform a secure D2D discovery in a D2D public safety group, selecting, by the transmitting UE, at least one PGK from the plurality of PGKs for securing D2D discovery message and group packets for D2D group communication, deriving, by the transmitting UE, a Prose discovery key (PDK) using the selected PGK, deriving, by the transmitting UE, a ProSe integrity protection key (PIK) from the derived PDK for securing a discovery message to be transmitted to one or more receiving UEs, integrity protecting, by the transmitting UE, the discovery message using the derived PIK, transmitting, by the transmitting UE, the integrity protected discovery message to the one or more receiving UEs, and receiving, by the transmitting UE, a response to the discovery message from the one or more receiving UEs, wherein the receiving UE derives a PIK using a PGK for the receiving UE to securely transmit the response.

According to one embodiment, the method further comprises of configuring PGKs for in coverage use and out of coverage use by a ProSe function.

According to one embodiment, the method further comprises of deriving security keys for securing discovering messages using PGKs dynamically configured by a Prose function.

According to one embodiment, the method further comprises of deriving security keys for securing discovering messages using pre-configured PGKs in absence of the Prose function.

Various embodiments herein further describe an apparatus for secured transmission and reception of discovery message in a device to device (D2D) communication system. The apparatus comprises of a memory, and a processor coupled to the memory, wherein the processor is adapted to: receive at least one ProSe group key (PGK) to perform a secure D2D discovery in a D2D Public Safety group, derive a ProSe traffic key (PTK) from the at least one PGK for transmitting data packets in the D2D public safety group, derive a Prose integrity protection key (PIK) from the derived PTK for securing a discovery message to discover one or more receiving UEs, integrity protect the discovery message using the derived PIK, transmit the integrity protected discovery message to the one or more receiving UEs, and receive a response to the discovery message from the one or more receiving UEs, wherein the receiving UE derives a PIK using a PGK for the receiving UE to securely transmit the response.

Various embodiments of the present invention herein describe a method of a terminal is disclosed. In one embodiment, the method comprises of deriving a first traffic key and a second traffic key based on a group key, deriving a first security key for securing a discovery message based on the first traffic key and a second security key for securing data packets based on the second traffic key, and transmitting the discovery message generated based on the first security key.

According to yet another embodiment, a method of a terminal is disclosed. The method comprises of receiving a discovery message, deriving a first traffic key and a second traffic key based on a group key, deriving a first security key for securing the discovery message based on the first traffic key and a second security key for securing data packets based on the second traffic key, and verifying the discovery message based on the first security key.

Various embodiments herein further describe a terminal, the terminal comprises of a transceiver for transmitting and receiving a signal, and a controller configured to, derive a first traffic key and a second traffic key based on a group key, derive a first security key for securing a discovery message based on the first traffic key and a second security key for securing data packets based on the second traffic key, and transmit the discovery message generated based on the first security key.

According to yet another embodiment, a terminal is disclosed. The terminal comprises of a transceiver for transmitting and receiving a signal, and a controller configured to receive a discovery message, derive a first traffic key and a second traffic key based on a group key, derive a first security key for securing the discovery message based on the first traffic key and a second security key for securing data packets based on the second traffic key, and verify the discovery message based on the first security key.

Various embodiments of the present invention herein describe a method of a terminal is disclosed. In one embodiment, the method comprises of deriving a first traffic key and a second traffic key based on a group key, deriving a first security key for securing a discovery message based on the first traffic key and a second security key for securing data packets based on the second traffic key, and transmitting the discovery message generated based on the first security key.

According to yet another embodiment, a method of a terminal is disclosed. The method comprises of receiving a discovery message, deriving a first traffic key and a second traffic key based on a group key, deriving a first security key for securing the discovery message based on the first traffic key and a second security key for securing data packets based on the second traffic key, and verifying the discovery message based on the first security key.

Various embodiments herein further describe a terminal, the terminal comprises of a transceiver for transmitting and receiving a signal, and a controller configured to, derive a first traffic key and a second traffic key based on a group key, derive a first security key for securing a discovery message based on the first traffic key and a second security key for securing data packets based on the second traffic key, and transmit the discovery message generated based on the first security key.

According to yet another embodiment, a terminal is disclosed. The terminal comprises of a transceiver for transmitting and receiving a signal, and a controller configured to receive a discovery message, derive a first traffic key and a second traffic key based on a group key, derive a first security key for securing the discovery message based on the first traffic key and a second security key for securing data packets based on the second traffic key, and verify the discovery message based on the first security key.

The foregoing has outlined, in general, the various aspects of the invention and is to serve as an aid to better understanding the more complete detailed description which is to follow. In reference to such, there is to be a clear understanding that the present invention is not limited to the method or application of use described and illustrated herein. It is intended that any other advantages and objects of the present invention that become apparent or obvious from the detailed description or illustrations contained herein are within the scope of the present invention.

Advantageous Effects of Invention

According to the present invention, discovery messages can be secured regardless of whether discovering UE and/or UE being discovered is in coverage of network or out of coverage of network.

BRIEF DESCRIPTION OF DRAWINGS

The other objects, features and advantages will occur to those skilled in the art from the following description of the preferred embodiment and the accompanying drawings in which:

FIG. 1 is a schematic diagram illustrating an exemplary discovery message protection, according to the prior art.

FIG. 2A is a flow diagram illustrating an exemplary discovery mechanism used to discover a group member, according to the prior art.

FIG. 2B is a flow diagram illustrating a discovery mechanism used to discover a group member, according to the prior art.

FIG. 3 is a flow diagram illustrating an exemplary method of secured transmission and reception of discovery message in a D2D communication, according to one embodiment.

FIG. 4 is a flow diagram illustrating an exemplary method of security key derivation for protecting a discovery message, according to one embodiment.

FIG. 5 is a flow diagram illustrating a method of security key derivation for protecting a discovery message, according to another embodiment.

FIG. 6 is a flow diagram illustrating a method of security key derivation for protecting a discovery message, according to yet another embodiment of the present invention.

FIG. 7 is a schematic diagram illustrating an exemplary discovery message protection, according to an embodiment of the present invention.

FIG. 8 is a schematic diagram illustrating an exemplary discovery message protection, according to another embodiment of the present invention.

Although specific features of the present invention are shown in some drawings and not in others, this is done for convenience only as each feature may be combined with any or all of the other features in accordance with the present invention.

MODE FOR THE INVENTION

The various embodiments of the present invention disclose a method of secured transmission and reception of discovery message in a device to device (D2D) communication. The discovery includes ProSe Public Safety Discovery having both Relay Discovery and Group Member Discovery. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to the present invention, the method of securing discovery messages works irrespective of whether the discovering UE and/or UE being discovered is in coverage of network or out of coverage of network. One of the issues for securing the discovery message for group member discovery is that which security key is used by transmitter and receiver.

FIG. 3 is a flow diagram illustrating an exemplary method of secure transmission and reception of discovery message in device to device (D2D) communication system, according to one embodiment. The D2D communication system comprises of a transmitting UE 302, a receiving UE 304 and a Prose Function 306. At step 1 and 2, the transmitting UE 302 and the receiving UE 304 transmits a request to the Prose function 306 to participate in D2D public safety (PS) group communication. At step 3 and 4, the prose function 306 configures Prose group Key (PGK) and other credentials to the transmitting UE 302 and the receiving UE 304. A Public Safety Discovery Key (PGK) is the root key that is used for the protection of the Public Safety Discovery messages. At step 5, the transmitting UE 302 derives a Prose traffic key (PTK) using the PGK configured by the Prose function 306. Further, at step 6, the transmitting UE derives two security keys namely a Prose integrity Protection key (PIK) and ProSe encryption key (PEK) from PTK. In an embodiment, PIK is derived directly from PGK along with other possible parameters. The transmitting UE 302 uses PIK for integrity protection and transmits integrity protected discovery message to the receiving UE. The discovery message comprises at least one of a PGK ID, a PTK ID, a PIK ID, a MIC code and a discovery code. The PEK is used for securely transmitting data packets to the receiving UE 304 in an encrypted manner. The PEK also known as Discovery message Confidentiality Key is derived either using PTK or directly from PGK along with other possible parameters. At step 7, the transmitting UE 302 transmits a discovery message securely to discover the receiving UE 304. In response to the discovery message, the receiving UE at step 8 derives PTK from PGK configured by the ProSe function 306 for the receiving UE 304 to participate in D2D public safety discovery and group communication. At step 9, the receiving UE 304 further derives two security keys namely PIK and PEK for performing secure transmission and at step 10, the receiving UE verifies the message received from the transmitting UE 302 using the derived PIK. Upon verifying the message, the receiving UE 304 at step 11, transmits a response to the discovery message, wherein the discovery message is secured using PIK (may be by PEK also) derived by the receiving UE 304.

FIG. 4 is a flow diagram illustrating an exemplary derivation of security key for protecting a discovery message, according to one embodiment. In this embodiment, consider that transmitting user equipment (UE) is a member of one of more groups and one or more Prose Group Keys (PGKs) per group are pre-configured for the transmitting UE. The one or more PGKs per group can also be dynamically configured by a ProSe Function to the transmitting UE. Each PGK is identified using 8 bit PGK ID and each PGK has corresponding expiry time. In the present invention, the PGK is used for securing both data packets and discovery messages for Prose group communication. The security keys for securing data packets and discovery messages are derived using PGK are illustrated in FIG. 4. At first step 1, the transmitting UE 402 transmits a request to a ProSe function 404 to participate in device to device (D2D) communication. As a response, the ProSe function 404 at step 2 configures a Prose group key to the transmitting UE 402. At step 3, the transmitting UE 402 derives a Prose Traffic Key (PTK), which is a member specific traffic key from the PGK for securing discovery message as well as data packets of a D2D group. The derived PTK is identified using 16 bit PTK ID. The PTK is derived using key derivative function of PGK, PTK ID, group member identity of transmitter and other parameters.

PTK=KDF (PGK, FC=0X4A, PGK ID, Length of PGK ID, PTK ID, Length of PTK ID, Group member identity of transmitter, <Other possible parameters>).

Then at step 4, the transmitting UE 402 uses the derived PTK to derive two keys namely ProSe Integrity protection key (PIK) and ProSe encryption Key (PEK), wherein both PEK and PIK is derived from PTK is as follows:

PEK=KDF (PTK, FC=0x4B, P0=0x00, Length of P0, Algorithm ID, length of Algorithm ID, <Other possible parameters>)).

PIK=KDF (PTK, FC=0x4B, P0=0x01, Length of P0, Algorithm ID, length of Algorithm ID, <Other possible parameters>)).

At step 5, the transmitting UE 402 uses the derived PIK to secure the discovery message and PEK to secure the data packets for prose group communication. In this embodiment, there is only one PGK and one PTK which is active per group for the UE.

In one embodiment, the discovery message(s) is protected using ProSe Protocol and group communication packets are protected using Packet Data Convergence Protocol (PDCP) protocol. Since, PGK and PTK is same for securing discovery message and group communication packets, the PDCP protocol and ProSe Protocol needs to coordinate with each other. In this embodiment, the Prose protocol may generate both PIK and PEK and provide PEK to PDCP protocol. Alternately, a key manager can be there in UE which maintains the keys and provide the PGK and PTK to UE and may also provide PIK and PEK to the appropriate protocol/protocol layer.

FIG. 5 is a flow diagram illustrating an exemplary derivation of security key for protecting a discovery message, according to one embodiment. As shown in FIG. 5, consider that the transmitting UE 502 transmits a request to a Prose function 504 to participate in a device to device (D2D) communication, at step 1. At step 2, a Prose Group Key (PGK) is configured by the Prose function 503 to the transmitting UE 502. In one embodiment, the PGKs are pre-configured in the transmitting UE 502. In the present invention, the PGK is used for securing discovery message in addition to securing data packets for Prose group communication. At step 3, the transmitting UE 502 derives a first traffic key (PTK1) and a second traffic key (PTK2) from the configured PGK. In this embodiment, two Prose Traffic Keys, PTK1 and PTK2 are obtained from the PGK for securing discovery message and data packets of a group respectively.

PTK1=KDF (PGK, FC=0X4A, PGK ID, Length of PGK ID, PTK IDx, Length of PTK IDx, Group member identity of transmitter, <Other possible parameters>)).

PTK2=KDF (PGK, FC=0X4A, PGK ID, Length of PGK ID, PTK IDy, Length of PTK IDy, Group member identity of transmitter, <Other possible parameters>)).

At step 4, the transmitting UE 502 derives a Prose integrity key (PIK) from the derived PTK 1 and derives Prose Encryption key (PEK) from the derived PTK2. The keys are derived as follows.

PEK=KDF (PTK2, FC=0x4B, P0=0x00, Length of P0, Algorithm ID, length of Algorithm ID, <Other possible parameters>)).

PIK=KDF (PTK1, FC=0x4B, P0=0x00 or 0x01, Length of P0, Algorithm ID, length of Algorithm ID, <Other possible parameters>)).

At step 5, the derived PIK is used to secure the discovery message and PEK is used to secure the data packets for prose group communication. In this embodiment, it is assumed that there is one PGK and two PTK which are active per group for the UE.

In one embodiment, the discovery message is protected using ProSe Protocol and group communication packets are protected using PDCP protocol. The Prose Protocol generates the PTK 1 and PIK where the PDCP protocol generates the PTK2 and PEK.

FIG. 6 is a flow diagram illustrating an exemplary derivation of security key for protecting a discovery message, according to one embodiment. As shown in FIG. 6, at step 1, a transmitting UE 602 transmits a request to a Prose function 604 to participate in a device to device (D2D) communication. At step 2, the ProSe function 604 configures a Prose Group key to the transmitting UE 602. The transmitting UE 602 is a member of one or more groups and each group has one or more Prose Group Keys (PGKs). In one embodiment, the transmitting UE is pre-configured with the one or more PGKs or PGKs can be dynamically configured by a ProSe function to the transmitting UE. The transmitting UE transmits a discovery message for group member discovery using PGK. In this embodiment, separate PGKs are used for securing discovery message and securing data packets for a D2D group communication. The separate PGKs for discovery and communication may be explicitly configured. Alternately, at step 3, the transmitting UE 602 selects different PGKs for discovery and communication. At step 4, a Prose Discovery Key (PDK) is derived from the selected PGK for securing discovery message. The derivation of PDK key is explained as follows.

The security key, PDK is derived as follows:
PDK=KDF (PGK-Discovery, FC=0X4A, PGK ID, Length of PGK ID, PDK ID, Length of PDK ID, Group member identity of transmitter, <Other possible parameters>)).

At step 5, the derived PDK is then used by the transmitting UE 602 to derive a ProSe integrity protection key (PIK). The PIK is derived as follows PIK=KDF (PDK, FC=0x4B, P0=0x00 or 0x01, Length of P0, Algorithm ID, length of Algorithm ID, <Other possible parameters>)).

The transmitting UE then transmits the discovery message with PIK to discover a receiving UE in the D2D group. Similarly, the receiving UE also generates PDK and PIK using PGK configured for the receiving UE and transmits the response to the discovery message along with the derived PIK thereby ensuring secured transmission.

FIG. 7 illustrates an enhanced discovery message protection mechanism, according to one embodiment. As shown in FIG. 7, a security key specific to member, discovery information to be transmitted and time stamp/time counter corresponding to discovery slot in which discovery information is transmitted is provided as input to security algorithm. The security algorithm generates a message integrity code (MIC). The MIC, PGK ID, PTK ID and 4LSBS of time counter together with discovery information is transmitted by the transmitter UE. In one embodiment, discovery information is also encrypted. In one embodiment, the Source UE ID and/or Group ID are also added in discovery message. They can be added in public safety (PS) discovery information. Further, the Source UE ID and/or Group ID can be added in protocol headers (e.g. MAC header) and can be transmitted to a receiving UE. The receiving UE determines a security key to be used using the PGK ID, PTK ID, source UE ID and Group ID received. The receiving UE, then decrypt and/or verify MIC received from the transmitting UE using the determined security key.

FIG. 8 illustrates an exemplary enhanced discovery message protection mechanism, according to another embodiment. In this enhanced discovery message protection, the discovery information is transmitted using parameters as mentioned in FIG. 7 along with PDU type field and a packet data convergence protocol (PDCP) sequence number (SN) field in which the field PDCP SN is optional in some cases. An out of coverage UE can maintain time counter using the universal coordinated time (UTC) time information provided by the synchronization source including but not limited to example, GPS, time function. Alternately, in coverage UE can relay the UTC time information to the out of coverage UE.

In one embodiment, the ProSe Function configures security credentials (for example, PGK, security algorithm) and other configurations (for example, radio configuration, ProSe application configuration, like so) for in coverage UE. The ProSe Function also configures security credentials (for example, PGK, security algorithm) and other configurations (for example, radio configuration, ProSe application configuration, like so) for out of coverage UE. The Prose function may configure the above configurations to in coverage and/or out of coverage using other RATs (e.g. 2G/3G/5G/WLAN). The UE may also be pre-configured with PGKs which are used when the UE has no access to ProSe Function. In case of partial coverage (i.e. TX UE is in coverage and RX UE is out of coverage or vice versa), there is mismatch between the PGK used at transmitter and receiver. In the present invention this mismatch is handled as follows:

First, the in coverage (IC) TX UE determines whether there are RX UEs in out of coverage (OOC). The IC TX UE determines OOC RX UEs using the following options. Firstly, the IC TX UE adds one bit indication in discovery message and transmits the same to the OOC RX UE. The OOC UE sets the one bit indication value to 1 and transmits the discovery message to the IC TX UE. In coverage UE checks for one bit indication that is received from the OOC RX UE before transmitting.

Secondly, the in coverage UE determines OOC UE by detection of D2DSS from OOC UE or 1 bit indication in D2DSCH. Thirdly, the in coverage UE determines OOC UE by the PGK ID used in the discovery and/or data (D2D user plane) packet. The IDs are assigned unique or in sequence (no repetition) for Pre-Configured and in coverage configuration. If the in coverage TX UE determines that there are OOC RX UEs, the in coverage TX UE uses the PGK from the Pre-configured PGKs. If there are no OOC RX UEs, then the IC TX UE uses the PGK configured by the Prose function.

In one embodiment, if the TX UE is in out of coverage, then the OOC TX UE always uses the PGK from the Pre-configured PGKs as it does not have access to ProSe Function. The in coverage RX UE determines the PGK used using pre-configured parameters for discovery message received from OOC UE. Otherwise, the in coverage RX UE determines the PGK used using parameters configured by ProSe Function for discovery message received from IC UE.

In another embodiment, the ProSe Function is aware of Pre-configured PGKs. Hence, the ProSe Function configures the same or a subset of PGKs from the Pre-configured PGKs for deriving security keys. In yet another embodiment, the in coverage TX UE uses the PGK from the Pre-configured PGKs. This means that PGKs are not configured by ProSe Function.

In a further embodiment, the indexes of distinct PGKs in pre configuration and in the configuration performed by ProSe Function are distinct. Therefore, if same PGK is there in pre configuration and in the configuration performed by ProSe Function, then its PGK ID is same. The TX UE in coverage follows the same procedure as mentioned in previous embodiments. And the RX UE in coverage determines the PGK used using both the pre configuration and configuration performed by ProSe Function.

In one embodiment, an out of coverage public safety (PS) UE communicate with an in coverage UE using a UE-NW relay. For that, the OOC PS UE needs to discover the UE-NW relay. In order for OOC PS UE to discover UE-NW relay, the UE-NW Relay first transmits discovery message. If the UE-NW relay uses the security key corresponding to group which it belongs, then only group members of relay can discover relay. This is an issue as relay should be discoverable by all PS UEs. So in this embodiment, PS UE having UE-NW Relay capability can be assigned a ProSe relay Key (PRK) for relay purpose. A common PRK is available in the system which is provided to each PS UE in addition to PGKs.

Although the invention of the method and system has been described in connection with the embodiments of the present invention illustrated in the accompanying drawings, it is not limited thereto. It will be apparent to those skilled in the art that various substitutions, modifications and changes may be made thereto without departing from the scope and spirit of the invention.

The invention claimed is:

1. A method of a terminal, the method comprising:
   deriving a first traffic key and a second traffic key based on a group key;
   deriving a first security key for securing a discovery message based on the first traffic key;
   deriving a second security key for securing data packets based on the second traffic key; and
   transmitting the discovery message generated based on the first security key,
   wherein the first security key is a proximity based services (ProSe) integrity protection key (PIK) and the second security key is a ProSe encryption key (PEK).

2. The method of claim 1,
   wherein the discovery message includes information including at least one of an identification (ID) for the group key, an ID for the first traffic key, an ID for the second traffic key, an ID for the terminal, or an ID for a group in which the terminal is included.

3. The method of claim 2,
   wherein the discovery message is verified based on the first security key.

4. The method of claim 1,
   wherein the group key is identified using an 8-bit group key ID, and
   wherein the first traffic key and the second traffic key are identified using a 16-bit traffic key ID.

5. The method of claim 1, wherein the discovery message is protected in ProSe protocol and the data packets are protected in PDCP protocol.

6. A method of a terminal, the method comprising:
   receiving a discovery message;
   deriving a first traffic key and a second traffic key based on a group key;
   deriving a first security key for securing the discovery message based on the first traffic key,
   deriving a second security key for securing data packets based on the second traffic key; and
   verifying the discovery message based on the first security key,
   wherein the first security key is a proximity based services (ProSe) integrity protection key (PIK) and the second security key is a ProSe encryption key (PEK).

7. The method of claim 6, further comprising:
   transmitting a response message.

8. The method of claim 6,
   wherein the discovery message includes information including at least one of an identification (ID) for the group key, an ID for the first traffic key, an ID for the second traffic key, an ID for the terminal, or an ID for a group in which the terminal is included.

9. The method of claim 6,
   wherein the group key is identified using an 8-bit group key ID, and
   wherein the first traffic key and the second traffic key are identified using a 16-bit traffic key ID.

10. The method of claim 6, wherein the discovery message is protected in protocol and the data packets are protected in PDCP protocol.

11. A terminal comprising:
    a transceiver for transmitting and receiving a signal; and
    a controller configured to:
       derive a first traffic key and a second traffic key based on a group key,
       derive a first security key for securing a discovery message based on the first traffic key,
       derive a second security key for securing data packets based on the second traffic key, and
       transmit the discovery message generated based on the first security key,
    wherein the first security key is a proximity based services (ProSe) integrity protection key (PIK) and the second security key is a ProSe encryption key (PEK).

12. The terminal of claim 11,
wherein the discovery message includes information including at least one of an identification (ID) for the group key, an ID for the first traffic key, an ID for the second traffic key, an ID for the terminal, or an ID for a group in which the terminal is included.

13. The terminal of claim 12,
wherein the discovery message is verified based on the first security key.

14. The terminal of claim 11,
wherein the group key is identified using an 8-bit group key ID, and
wherein the first traffic key and the second traffic key are identified using a 16-bit traffic key ID.

15. The terminal of claim 11, wherein the discovery message is protected in ProSe protocol and the data packets are protected in PDCP protocol.

16. A terminal, the terminal comprising:
a transceiver for transmitting and receiving a signal; and
a controller configured to:
  receive a discovery message,
  derive a first traffic key and a second traffic key based on a group key,
  derive a first security key for securing the discovery message based on the first traffic key,
  derive a second security key for securing data packets based on the second traffic key, and
  verify the discovery message based on the first security key,
wherein the first security key is a proximity based services (ProSe) integrity protection key (PIK) and the second security key is a ProSe encryption key (PEK).

17. The terminal of claim 16, wherein the controller is further configured to transmit a response message.

18. The terminal of claim 16,
wherein the discovery message includes information including at least one of an identification (ID) for the group key, an ID for the first traffic key, an ID for the second traffic key, an ID for the terminal, or an ID for a group in which the terminal is included.

19. The terminal of claim 16,
wherein the group key is identified using an 8-bit group key ID, and
wherein the first traffic key and the second traffic key are identified using a 16-bit traffic key ID.

20. The terminal of claim 16, wherein the discovery message is protected in ProSe protocol and the data packets are protected in PDCP protocol.

* * * * *